(12) United States Patent
Matsumura et al.

(10) Patent No.: US 7,767,724 B2
(45) Date of Patent: Aug. 3, 2010

(54) EXPANDABLE RESIN BEADS OF STYRENE-MODIFIED STRAIGHT-CHAIN AND LOW-DENSITY POLYETHYLENE, PROCESS FOR PRODUCTION THEREOF, PRE-EXPAND BEADS, AND FOAMS

(75) Inventors: Hideyasu Matsumura, Shiga (JP); Yasutaka Tsutsui, Shiga (JP)

(73) Assignee: Sekisui Plastics Co., Ltd., Osaka (JP)

( * ) Notice: Subject to any disclaimer, the term of this patent is extended or adjusted under 35 U.S.C. 154(b) by 699 days.

(21) Appl. No.: 10/541,391

(22) PCT Filed: Mar. 22, 2004

(86) PCT No.: PCT/JP2004/003854

§ 371 (c)(1), (2), (4) Date: Jul. 1, 2005

(87) PCT Pub. No.: WO2004/085528

PCT Pub. Date: Oct. 7, 2004

(65) Prior Publication Data

US 2006/0058406 A1 Mar. 16, 2006

(30) Foreign Application Priority Data

Mar. 25, 2003 (JP) ............................. 2003-082973

(51) Int. Cl.
- C08J 9/16 (2006.01)
- C08J 9/18 (2006.01)
- B22C 1/22 (2006.01)
- B29C 44/34 (2006.01)

(52) U.S. Cl. ............................. 521/56; 521/59; 521/60; 521/139; 521/142

(58) Field of Classification Search ................. 521/142, 521/56, 59, 60, 139
See application file for complete search history.

(56) References Cited

U.S. PATENT DOCUMENTS

| | | | | |
|---|---|---|---|---|
| 3,963,816 A | * | 6/1976 | Smith | ........................ 264/53 |
| 4,368,218 A | * | 1/1983 | Senda et al. | ................ 427/222 |
| 6,608,150 B1 | * | 8/2003 | Wicher | ........................ 526/73 |

FOREIGN PATENT DOCUMENTS

| | | |
|---|---|---|
| DE | 2413321 | 10/1975 |
| FR | 2264841 | 10/1975 |
| JP | 51-46138 | 1/1974 |
| JP | 50-127965 | 10/1975 |
| JP | 52-76372 | 6/1977 |
| JP | 62-059642 | 3/1987 |
| JP | 1-284536 | 11/1989 |
| JP | 2668384 | 11/1989 |

OTHER PUBLICATIONS

English translation of JP 01-284536 provided by Schreiber Translations.*
English Language Abstract of JP 1-284536.
English Language Abstract of JP 62-059642.

* cited by examiner

*Primary Examiner*—James Seidleck
*Assistant Examiner*—Melissa Rioja

(57) ABSTRACT

According to the present invention, there is provided expandable beads of a styrene-modified linear low-density polyethylene-based resin comprising a volatile blowing agent and a base resin, the base resin containing more than 300 parts by weight and less than 1000 parts by weight of a polystyrene-based resin component relative to 100 parts by weight of a non-crosslinked linear low-density polyethylene-based resin component, wherein the base resin contains 2 to 40 wt % of a gel component comprising a graft copolymer of the polystyrene-based resin component and the low-density polyethylene-based resin component.

20 Claims, No Drawings

EXPANDABLE RESIN BEADS OF STYRENE-MODIFIED STRAIGHT-CHAIN AND LOW-DENSITY POLYETHYLENE, PROCESS FOR PRODUCTION THEREOF, PRE-EXPAND BEADS, AND FOAMS

TECHNICAL FIELD

The present invention relates to expandable particles of a styrene-modified linear low-density polyethylene-based resin, production method therefor, pre-expanded particles and expanded molded article.

BACKGROUND ART

A polyethylene-based resin foam is generally used as a packing material owing to its high resilience and excellent oil and impact resistance. The polyethylene-based resin foam, however, has drawbacks that its stiffness and compressive strength are low. On the other hand, a polystyrene-based resin foam is excellent in stiffness, but has a drawback that it is brittle.

To overcome such drawbacks, Japanese Examined Patent Publication No. SHO 51 (1976)-46138 and Japanese Unexamined Patent Publication No. SHO 62 (1987)-59642 disclose a method for obtaining expandable particles of a styrene-modified polyethylene-based resin by impregnating a styrene monomer into a polyethylene-based resin for polymerization.

Examples of the polyethylene-based resin used in the method substantially include low-density polyethylene, high-density polyethylene, and an ethylene-vinyl acetate copolymer. In most cases, polyethylene is cross-linked to improve its moldability and physical properties of a molded product. The cross-linking of polyethylene increases the strength of foam membrane and also increases the tension of the membrane at expansion molding, so that the membrane is prevented from breaking and an expansion ratio can be increased.

Consequently, an expanded molded article with a fine appearance is provided and the impact strength of the expanded molded article can be increased. This method, however, requires that pre-crosslinked polyethylene be used or a cross-linking step be provided for cross-linking polyethylene after a temperature is furthermore raised at the end of the polymerization of styrene monomer.

To solve the above-mentioned problems, Japanese Patent No. 2668384 also discloses a method for obtaining an expanded molded article of a modified polyethylene-based resin excellent in stiffness and impact resistance. In this method, 100 parts by weight of non-crosslinked linear low-density polyethylene-based resin particles, 5 to 300 parts by weight of a vinyl aromatic monomer, and 1 to 3 parts by weight of a polymerization initiator relative to 100 parts by weight of the vinyl aromatic monomer are dispersed in an aqueous medium. Then, a suspension thus obtained is heated at such a temperature that polymerization of the monomer does not substantially take place for impregnation of the monomer into an inside and a surface of the polyethylene-based resin particles. Subsequently, the temperature of the suspension is raised to polymerize the monomer, as a result, the expanded molded article of the modified polyethylene-based resin is obtained by micro-dispersion of a vinyl aromatic polymer in polyethylene.

In Examples of the above-mentioned patent, a styrene monomer is added to linear low-density polyethylene-based resin particles having a melting point of 122° C. for polymerization at 115° C. (the melting point of the resin particles is not specified in Examples, but the present inventors confirmed from the product name of the resin particles described in Examples that the particles have the above-mentioned melting point). The polymerization at this temperature often results in graft polymerization of styrene monomer on a polyethylene chain. Consequently, though a resultant resin is not cross-linked, the graft polymerization of polystyrene on the polyethylene chain occurs, and thereby a fine expanded molded article can be provided. Hereinafter, the term "graft polymer" means a gel component containing polystyrene, and the term "crosslinked polymer" means a gel component substantially not containing polystyrene.

In the above-mentioned patent, an amount of the styrene monomer is 5 to 300 parts by weight relative to 100 parts by weight of polyethylene, and when more than 300 parts by weight of the styrene monomer is impregnated into polyethylene, there is a problem that a large amount of polymer powder of polystyrene is generated.

Where a styrene monomer is impregnated into polyethylene-based resin particles for polymerization to obtain a resin which is subsequently impregnated with a volatile blowing agent and molded by heating to obtain an expanded molded article, polyethylene needs to be cross-linked for enhancing impact resistance of the expanded molded article and for reducing a size variation of the expanded molded article after heating. In other words, the cross-linking of polyethylene is required for the expanded molded article to have heat resistance and higher stiffness. However, there has been a problem that the cross-linking involves an increase in cost due to the use of a crosslinker and an increase in a production step.

Accordingly, there has been desired development of expandable particles of a styrene-modified linear low-density polyethylene-based resin capable of providing an expanded molded article having sufficient strength, in which a ratio of styrene monomer to polyethylene can be widely changed.

DISCLOSURE OF INVENTION

The object of the present invention is to provide an expanded molded article having an improved stiffness and an excellent dimensional stability at heating while maintaining a fundamental property, i.e., excellent impact resistance that polyethylene possesses, without cross-linking a polyethylene chain.

The present inventors made an extensive study to achieve the above-mentioned object and found that expandable particles of a styrene-modified linear low-density polyethylene-based resin are obtained by selecting a linear low-density polyethylene-based resin as polyethylene, and by controlling selection of types and amount of a polymerization initiator and a polymerization temperature when impregnating a styrene-based monomer into the resin for polymerization. The expandable particles thus obtained can control an amount of a gel component derived from, for example, graft polymerization of styrene on the polyethylene chain, and provide an expanded molded article which satisfies physical properties such as impact resistance, stiffness and heat resistance. Thus, the present inventors achieved the present invention.

According to the present invention, there is provided a method for producing expandable particles of a styrene-modified linear low-density polyethylene-based resin comprising, in the order recited, the steps of:

dispersing 100 parts by weight of non-crosslinked linear low-density polyethylene-based resin particles, 30 to 300 parts by weight of a styrene-based monomer, and 0.1 to 0.9 parts by weight of a polymerization initiator relative to 100 parts by weight of the styrene-based monomer into a suspension containing a dispersant;

impregnating the styrene-based monomer into the low-density polyethylene-based resin particles by heating a resultant dispersion at such a temperature that polymerization of the styrene-based monomer does not substantially take place;

performing a first polymerization of the styrene-based monomer at a temperature of higher than (T−8)° C. and lower than (T+1)° C. (where T ° C. is a melting point of the low-density polyethylene-based resin particles);

adding a styrene-based monomer and 0.1 to 0.9 parts by weight of a polymerization initiator relative to 100 parts by weight of the styrene-based monomer when a conversion ratio of polymerization reaches to 80 to 99.9%, and performing impregnation of the styrene-based monomer into the polyethylene-based resin particles and a second polymerization of the styrene-based monomer at a temperature of higher than (T−15)° C. and lower than (T+5)° C. (where T ° C. is a melting point of the polyethylene-based resin particles) (wherein a total amount of the styrene monomers used in the first and second polymerizations is more than 300 parts by weight and not more than 1000 parts by weight relative to 100 parts by weight of the low-density polyethylene-based resin particles); and impregnating a volatile blowing agent during or after the polymerization, whereby resin components of the expandable particles contain a gel component comprising 2 to 40 wt % of a graft polymer.

Further, the present invention provides expandable particles of a styrene-modified linear low-density polyethylene-based resin comprising a volatile blowing agent and a base resin, the base resin containing more than 300 parts by weight and not more than 1000 parts by weight of a polystyrene-based resin component relative to 100 parts by weight of a non-crosslinked linear low-density polyethylene-based resin component, wherein the base resin contains 2 to 40 wt % of a gel component comprising a graft polymer of the low-density polyethylene-based resin component and the polystyrene-based resin component.

Still further, the present invention provides pre-expanded particles having a bulk density of 20 to 200 kg/m³ obtained by pre-expanding the above-mentioned expandable particles of the styrene-modified linear low-density polyethylene-based resin.

Still yet, the present invention provides an expanded molded article having a density of 20 to 200 kg/m³ thus obtained by expansion molding of the above-mentioned pre-expanded particles.

BEST MODE FOR CARRYING OUT THE INVENTION

Expandable particles of a styrene-modified linear low-density polyethylene-based resin (hereinafter referred to as expandable resin particles) obtained by the production method of the present invention comprise a volatile blowing agent and a base resin containing a non-crosslinked linear low-density polyethylene-based resin component and the polystyrene-based resin component.

As the non-crosslinked linear low-density polyethylene-based resin component (hereinafter referred simply to as a polyethylene-based resin component) used in the present invention, a copolymer of ethylene and an α-olefin can be mentioned.

Examples of the α-olefin include 1-butene, 1-pentene, 1-hexene, 3,3-dimethyl-1-butene, 4-methyl-1-pentene, 4,4-dimethyl-1-pentene, and 1-octene. Among those, 1-butene and 1-hexene are preferable.

A ratio of ethylene to the α-olefin may vary depending upon physical properties desired and preferably in a range of 1:0.01 to 1:0.1 (weight ratio). The term "low-density" means a density in a range of 0.910 to 0.925 g/ml.

Low-density polyethylene, high-density polyethylene, an ethylene-propylene copolymer, an ethylene-vinyl acetate copolymer and an ethylene-acrylic acid copolymer which have a cross-link and/or a branched chain, and two or more types of these polymers may be used to such an extent that a desirable effect of the invention is not suppressed.

Examples of the polystyrene-based resin component include resin components derived from monomers such as styrene, α-methylstyrene, vinyltoluene, and chlorostyrene.

An amount of the polystyrene-based resin component is more than 300 parts by weight and not more than 1000 parts by weight, and preferably more than 300 parts by weight and not more than 900 parts by weight relative to 100 parts by weight of the polyethylene-based resin component.

While it is difficult to obtain the expandable resin particles uniformly containing not less than 300 parts by weight of the polystyrene resin component by conventional methods, the present invention can easily obtain the particles in a proper manner. In the case where the amount of polystyrene-based resin component exceeds 1000 parts by weight, characteristics of the polyethylene-based resin component, i.e., high resilience and excellent oil and impact resistance are hardly displayed. Furthermore, since styrene is not sufficiently absorbed into an inside of the polyethylene-based resin component and is polymerized alone, a large amount of polymer powder is generated.

As the volatile blowing agent, for example, a hydrocarbon such as propane, butane, isobutene, pentane, isopentane, cyclopentane, and hexane may be used alone, or two or more types of these hydrocarbons may be used in combination.

A content of the blowing agent is preferably 5 to 10 parts by weight relative to 100 parts by weight of the resin component (an amount of the polyethylene-based resin component and the polystyrene-based resin component in total) which constitute the expandable resin particles.

In the present invention, 2 to 40 wt % of the gel component (gel fraction) comprising the graft polymer of the polyethylene-based resin component and the polystyrene-based resin component is contained in the base resin of the expandable resin particles. A criterion for judging whether or not the gel component is a graft polymer is the presence or absence of polystyrene in the gel component. In the present invention, the gel component containing 10 wt % or more of polystyrene is defined as the graft polymer. A method for determining a polystyrene content in the gel component is described in Examples.

A gel fraction of less than 2 wt % is not preferable since changes in dimension of the expanded molded article at heating and the impact resistance are not sufficiently improved. On the other hand, the gel fraction of more than 40 wt % is also not preferable since the strength of cell membranes is too high and elongation at formation of the expanded molded article is poor, resulting in deterioration of the expanded molded article in appearance. Thus, the gel fraction is preferably 5 to 35 wt %.

Preferably, the expandable resin particles each have a substantially spherical shape or a cylindrical shape having an L/D (where L is a length of each particle and D is a diameter of each particle) of 0.6 to 1.6, and an average particle size of 0.3 to 2.0 mm.

The particles having a high ovality such that the L/D is not more than 0.6 and not less than 1.6 are not preferable since the expandable resin particles have poor mold fillability when they are pre-expanded as expandable styrene-modified resin particles and filled into a mold to obtain the expanded molded article. The shape of the expandable resin particles preferably is substantially spherical to improve the mold fillability.

The average particle size of less than 0.3 mm is not preferable because a retention of the blowing agent decreases and a reduction of density of the expanded molded article is difficult. The average particle size of more than 2.0 mm is also not preferable since not only the particles have poor mold fillability, but also thinning of the expanded molded article is difficult.

A production method for the expandable resin particles of the invention will hereinafter be described.

Where the amount of styrene-based monomer exceeds 300 parts by weight relative to 100 parts by weight of the polyethylene-based resin particles, the amount of polymer powder of polystyrene tends to increase when only a single impregnation is performed. To minimize the generation of the polymer powder, the styrene-based monomers are impregnated into the polyethylene-based resin particles in two separate steps as described below.

Preferably, the polyethylene-based resin particles used in the method each have the substantially spherical shape or the cylindrical shape having an L/D (where L is a length of each particle and D is a diameter of each particle) of 0.6 to 1.6, and preferably have an average particle size of 0.2 to 1.5 mm. The polyethylene-based resin particles having a high ovality such that the L/D is not more than 0.6 and not less than 1.6 are not preferable since the polyethylene-based resin particles have poor mold fillability when they are pre-expanded as the expandable styrene-modified resin particles and filled into a mold to obtain the expanded molded article. The shape of the polyethylene-based resin particles preferably is substantially spherical to improve mold fillability. The average particle size of less than 0.2 mm is not preferable since a retention of the blowing agent decreases and a reduction of the density of the expanded molded article is difficult. The average particle size of more than 1.5 mm is also not preferable because not only the particles have poor mold fillability, but also thinning of the expanded molded article is difficult.

Examples of an aqueous medium which is a component of the suspension include water and a mixed medium of water and an aqueous solvent (e.g., a lower alcohol).

A dispersant is not particularly limited and any conventional dispersant may be used. Specifically, the dispersant may be practically insoluble inorganic substances such as calcium phosphate, magnesium pyrophosphate, sodium pyrophosphate, and magnesium oxide.

A polymerization initiator may be one that is generally used as a suspension polymerization initiator of the styrene-based monomer. However, a gel generation rate varies depending upon a type of the polymerization initiator to be used. For example, use of t-butyl peroxybenzoate, dicumyl peroxide, t-butyl-peroxy-2-ethylhexyl carbonate, 2,5-dimethyl-2,5-di-t-butylperoxyhexane or the like which abstracts more hydrogen atoms increases the amount of gel to be generated. On the other hand, use of t-butyl peroxy-3,5,5-trimethylhexanoate, t-butyl peroxyacetate, 2,2-di-t-butyl peroxybutane or the like which abstracts less hydrogen atoms decreases the amount of gel to be generated. The above-mentioned polymerization initiators may be adopted alone, or two or more types of these polymerization initiators may be used in combination depending upon a desirable gel fraction.

An amount of the polymerization initiator is preferably 0.1 to 0.9 parts by weight, and more preferably 0.2 to 0.5 parts by weight relative to 100 parts by weight of the styrene-based monomer. The polymerization initiator in an amount of less than 0.1 parts by weight is not preferable since styrene is not smoothly polymerized, and thereby polystyrene and polyethylene are not homogeneously mixed in the resin particles and a larger amount of polymer powder is generated. Use of the polymerization initiator in an amount of more than 0.9 parts by weight decreases a molecular weight of the polystyrene-based resin.

A molecular weight of polystyrene-based resin component is preferably about 200,000 to 400,000 to achieve fine physical properties. The polymerization initiator in an amount of more than 0.9 parts by weight can only achieve a styrene molecular weight less than the above range.

An amount of the styrene-based monomer used in the first polymerization is in a range of 30 to 300 parts by weight relative to 100 parts by weight of the polyethylene-based resin particles. The styrene-based monomer in an amount of less than 30 parts by weight is not preferable since the styrene-based monomer is not homogeneously impregnated into polyethylene. The styrene-based monomer in an amount of more than 300 parts by weight is not preferable since the polymer powder derived from the styrene-based monomer is more easily generated.

The resultant dispersion is heated to such a temperature that polymerization of the styrene-based monomer does not substantially take place to impregnate the styrene-based monomer into the polyethylene-based resin particles.

An appropriate time required for impregnating the styrene-based monomer into the inside of the polyethylene-based resin particles is 30 minutes to 2 hours, since when the polymerization proceeds before the styrene-based monomer is sufficiently impregnated into the resin particles, the polymer powder of polystyrene is generated. The temperature at which the styrene-based monomer is substantially not polymerized should be higher to accelerate an impregnation rate, but the temperature needs to be determined in due consideration of a decomposition temperature of the polymerization initiator.

The first polymerization of the styrene-based monomer is carried out at a temperature of (T−8) to (T+1)° C. (where T ° C. is the melting point of the above-mentioned polyethylene-based resin particles). Where the polymerization temperature is lower than (T−8)° C. or higher than (T+1)° C., sufficient graft polymerization can not be achieved.

When the conversion ratio of polymerization reaches to 80 to 99.9%, the styrene-based monomer and 0.1 to 0.9 parts by weight of the polymerization initiator relative to 100 parts by weight of the styrene-based monomer are added, and the temperature is set to (T−15) to (T+5)° C. (where T ° C. is the melting point of the polyethylene-based resin particles), so that the impregnation of the styrene-based monomer into the low-density polyethylene-based resin particles and a second polymerization are performed. The amount of the styrene-based monomer used in the first and second polymerization in total is more than 300 parts by weight and not more than 1000 parts by weight.

Where more than 300 parts by weight of the styrene-based monomer is added when the conversion ratio of polymerization reaches to 80%, the styrene-based monomer is quickly impregnated into the polyethylene-based resin particles for quick polymerization, whereby the generation of polymer powder of polystyrene can be suppressed. When the conversion ratio of polymerization exceeds 99.9%, the impregnation of the styrene-based monomer added is difficult and a conversion ratio decreases, causing the generation of the powdered particles difficult to be suppressed.

A mixed solution containing the styrene-based monomer and the polymerization initiator may be added continuously or intermittently for the second polymerization. To prevent the generation of the polymer powder, the impregnation into the inside of the polyethylene-based resin particles and the polymerization are preferably performed at almost the same time. A fast addition rate is not preferable because the fast addition rate in combination with a relatively high polymerization temperature causes the polymerization to occur before the resin particles are impregnated. An extremely slow addition rate is not preferable since it may hinder the polymerization. For example, the addition rate for 300 to 1000 parts by weight of the styrene-based monomer is 3 to 5 hours.

Furthermore, the polymerization temperature of the second polymerization preferably ranges from $(T-8)$ to $(T+1)°$ C., so that the graft polymerization occurs more efficiently.

The volatile blowing agent is impregnated into the resin particles during or after the polymerization, so that the expandable resin particles are obtained. This impregnation of the blowing agent can be performed by a per se known method. For example, the impregnation during polymerization can be carried out by conducting the polymerization in a closed vessel, and by injecting the volatile blowing agent into the vessel. The impregnation after the polymerization is carried out by injecting the volatile blowing agent into a closed vessel. In the impregnation after the polymerization, a vessel for the polymerization may not be a closed vessel as long as the impregnation is carried out in the closed vessel.

The expandable resin particles of the present invention thus obtained may serve as pre-expanded particles by pre-expanding the expandable resin particles to a predetermined bulk density (e.g., 20 to 200 kg/m$^3$) by a conventional method. A method for determining the bulk density will be described in Examples.

Furthermore, an expanded molded article is provided by filling the pre-expanded particles into a mold and heating the pre-expanded particles again to allow them to fuse together by heat while expansion.

As a medium for heating the pre-expanded particles, steams are suitably used. A density of the expanded molded article is preferably 20 to 200 kg/m$^3$. The expanded molded article having a density of less than 20 kg/m$^3$ is not preferable since sufficient strength is not achieved. The expanded molded article having a density of more than 200 kg/m$^3$ is also not preferable since a reduction in weight can not be achieved and the expanded molded article may not be able to sufficiently exert characteristics of polyethylene including resilience.

The expanded molded article thus obtained is tough and excellent in impact strength. Furthermore, the expanded molded article has high stiffness due to the modification of styrene.

A falling ball impact value of the expanded molded article is preferably 85 cm or more. The expanded molded article having a falling ball impact value of less than 85 cm may be used, but if the expanded molded article has a falling ball impact value of not less than 85 cm, it is applicable to packing materials, etc. for fragile products and heavy components. The falling ball impact value of the expanded molded article is more preferably 90 cm or more. A method for measuring the falling ball impact value will be described in Examples.

The expanded molded article of the present invention may be used for various purposes, and particularly suitable for material for interior furnishings of a car, energy absorbing material to be inserted inside a bumper, packing material for heavy products, and the like.

EXAMPLES

The present invention will hereunder be described with reference to Examples and Comparative Examples, but it should be understood that the invention be not limited by these Examples and Comparative Examples. Methods for determining values shown in Examples and Comparative Examples are described below.

(Determination of Gel Fraction)

For determination of a gel fraction, a sample of resin particles was weighed, the sample was put in a flask, and 100 ml of toluene was added. The particles were then dissolved in an oil bath at 130° C. for 24 hours. After the flask was taken out from the oil bath, a resultant mixture was immediately filtered by an 80-mesh (φ0.12 mm) wire gauze, and a sample remaining on the wire gauze which is insoluble in boiling toluene and the wire gauze were then allowed to stand in an oven at 130° C. for an hour to remove toluene, and a weight of the resultant solid was measured. The gel fraction is determined by the following equation:

$$\frac{\text{Weight of resultant solid}}{\text{Weight of sample}} \times 100 = \text{gel fraction (wt \%)}$$

About 200 μg of the resultant solid was weighed and enwrapped in a ferromagnetic metal (Pyrofoil: manufactured by Japan Analytical Industry Co., Ltd.) so as to be in close contact with each other. Then, a pyrolysate was generated using a pyrolysis apparatus called Curie Point Pyrolyzer Model JHP-3 (manufactured by Japan Analytical Industry Co., Ltd.). The pyrolysate was analyzed using Gas Chromatograph Auto System (manufactured by Perkin Elmer) to determine an polystyrene content from the analytical result. The following analytical conditions were adopted. Pyrolysis temperature: 590° C.-5 sets, oven temperature: 280° C., needle temperature: 300° C., column: DB-5 (0.25 μm×φ0.25 mm×30 m, manufactured by J & W), column temperature: 50° C. (1 min)→temperature rise of 10° C./min→100° C. temperature rise of 40° C./min→320° C. (3.5 min), carrier gas: He, carrier flow rate: 1 ml/min, pressure at column inlet: 12 psi, temperature at column inlet: 300° C., temperature of a detector: 300° C., and detector: FID. Determination was made by an absolute calibration curve method using polystyrene resin QC254 manufactured by Asahi Kasei Co., as a standard sample.

When the polystyrene content is 10 wt % or more, it was determined that a gel component comprises a graft polymer but not a cross-linked polymer.

(Measurement of Powder Content)

For measurement of a powder content, about 1000 g of a polymerized slurry sample was introduced into a polymer beaker having a water vent with 35-mesh wire gauze attached on its top. Into this beaker about 6 liter of wash water was gradually introduced, and liquid flowed out of the vent was collected. The collected liquid was filtered by a glass fiber paper filter (GA-100) and dried in an oven at 60° C. for 3 hours to measure the weight of dried polymer powder. The resin remained in the slurry sample after washing was dried and weighed as well. The powder content was determined by the following equation:

$$\frac{\text{Weight of powder resin (g)}}{\text{Weight of dried resin (g)}} \times 100 = \text{powder content (wt \%)}$$

(Measurement of Molecular Weight of Polystyrene Resin Component in Resin Particles)

An average molecular weight (Mw) of a polymer was measured by GPC (Gel Permeation Chromatography) under the following conditions.

Measuring Equipment:
   High-speed GPC equipment HLC-8020 manufactured by Tosoh Corp.

Column: HSG-60S×2, HSG-40H×1, HSG-20H×1 manufactured by Sekisui Fine Chemicals Co., Ltd.

Measuring Conditions:
   Column temperature: 40° C.
   Moving bed: THF (tetrahydrofuran)
   Flow rate: 1.0 ml/min
   Injection amount: 500 ml
   Detector: RID-6A
   manufactured by Tosoh Corp.

Molecular weight determination of the sample: For measuring a molecular weight of a sample, conditions for measuring were selected so that a molecular weight distribution of the sample overlaps a range of a linear calibration curve correlating a count number with a logarithm of the molecular weight of various monodisperse polystyrene standard samples.

In the present invention, the calibration curve for polystyrene was plotted using six polystyrene standard samples (TSK standard polystyrene) respectively having a weight-average molecular weight of $2.74 \times 10^3$, $1.91 \times 10^4$, $1.02 \times 10^5$, $3.55 \times 10^5$, $2.89 \times 10^6$, $4.48 \times 10^6$ manufactured by Tosoh Corp.

(Determination of Bulk Density)

A bulk density was determined according to a method described in JIS K 6911:1955 "General Testing Methods for Thermosetting Plastics". Specifically, pre-expanded particles free-falling into a graduated cylinder by an apparent density measuring instrument was weighed to determine their bulk density by the following equation.

bulk density (kg/m$^3$)=weight (kg)/bead volume in the graduated cylinder (m$^3$)

(Determination of Density of Expanded Molded Article)

A density of an expanded molded article was determined according to a method described in JIS A 9511:1995 "Preformed Cellular Plastics Thermal Insulation Materials".

(Measurement of Compressive Strength)

A compressive strength was measured according to a method described in JIS A 9511:1995 "Preformed Cellular Plastics Thermal Insulation Materials". In other words, the compressive strength of a test specimen having a size of 50×50×50 mm was measured when it was compressed by 5% using a universal testing machine Tensilon UCT-10T (manufactured by Orientech Co.) under a compressive rate of 10 mm/min.

(Measurement of Impact Strength)

For measurement of impact strength, an expanded molded article was cut to form a sample having a size of 215×40×20 mm, and the sample was then placed on a pair of holding members arranged at a distance of 155 mm. A steel ball weighing 321 g was added on the middle of the sample in width direction thereof at a position halfway between the pair of holding members to see whether or not the sample was crushed.

The test was repeated at different heights of drop and the minimum height of drop that produced crush on the sample was defined as a falling ball impact value to evaluate the impact strength. Thus, the impact strength increases as the falling ball impact value increases.

(Determination of Dimensional Change Rate Under Heat)

A flat-shaped expanded molded article having a size of 400 mm length, 300 mm width, and 16 mm thickness was taken out from a mold, and allowed to stand at a constant temperature for 24 hours in a thermohygrostat (in a state of standard temperature of 23° C. and 50% relative humidity of JIS-K7100). Then, a flat square board (150 mm length, 150 mm width, and 16 mm thickness) having parallel, upper and lower surfaces was cut out from the center of the expanded molded article. On the middle of the board, three straight parallel lines were drawn respectively in vertical and lateral direction so as to be 50 mm apart from each other to form a specimen that complies with JIS-K6767. After the specimen was measured for its dimension (dimension before heating: L1), it was placed horizontally in an oven with internal air circulation maintained at 80° C. The specimen was then taken out from the oven after being heated for 168 hours, and again allowed to stand at the constant temperature for an hour in the thermohygrostat to measure the specimen for its dimension (dimension after heating: L2). The measurement of dimensions before and after the heating test was carried out in compliance with JIS-K6767, and a dimensional change rate was determined by the following equation.

dimensional change rate (%)=(L2−L1)×100/L1

(wherein L1 is a dimension of the specimen obtained from the expanded molded article after it was molded and kept standing at 23° C. and 50% RH for 24 hours. L2 is a dimension of the specimen after the expanded molded article was heated at 80° C. for 168 hours.)

The dimension of the specimen is an average length of the three lines provided both in vertical and horizontal directions of the specimen obtained from the expanded molded article.

It was determined that the expanded molded article with a dimensional change rate of 0.5% or less has heat resistance.

Example 1

(Production Of Polyethylene-Based Resin Particles)

Linear low-density polyethylene (ethylene-hexene copolymer, melt index of 1.0 g/10 min, density of 0.921 g/ml, melting point of 126° C.) was granulated by an extruder to obtain polyethylene-based resin particles of substantially spherical shape having an L/D of 0.9 and an average particle size of 0.8 mm. As a foam regulator, 0.5 parts by weight of talc relative to 100 parts by weight of the above-mentioned polyethylene was added at the granulation.

(Production of Styrene-Modified Polyethylene-Based Resin Particles)

40 kg of pure water, 200 g of magnesium pyrophosphate as a dispersant, and 20 g of sodium dodecylbenzenesulfonate were introduced in an autoclave having an internal volume of 100 liter to prepare an aqueous medium. 8 kg of the above-mentioned polyethylene-based resin particles was suspended in the aqueous medium and stirred at 150 rpm.

Into the autoclave, a mixed solution containing 16 kg of a styrene monomer (200 parts by weight relative to 100 parts by weight of polyethylene) and 48 g of t-butylperoxy-2-ethylhexylcarbonate (TBPOEHC) (0.3 parts by weight relative to 100 parts by weight of the styrene monomer) as a polymerization initiator was added and allowed to stand at 60° C. for 60 minutes to impregnate the styrene monomer into the polyethylene-based resin.

Then, the temperature was raised to 119° C. and polymerization was carried out for 3 hours. After a conversion ratio of polymerization of the styrene monomer reached to 85%, a mixed solution containing 16 kg of the styrene monomer (200 parts by weight relative to 100 parts by weight of polyethylene) and 48 g of t-butylperoxybenzoate (TBPB) (0.3 parts by weight relative to 100 parts by weight of the styrene monomer) as a polymerization initiator was added over a period of 3 hours to perform polymerization while impregnating the styrene monomer into the inside of polyethylene. Then, by raising to 140° C. and maintained for 2 hours, the remaining monomer was forcibly polymerized to reduce its amount, and then the autoclave was cooled to take out styrene-modified polyethylene-based resin particles.

The gel fraction measured was 7.2 wt %. The polystyrene content in the gel component was 22.2 wt % and the powder content in the polymerized slurry was 0.7 wt %. The molecular weight of the polystyrene resin component was about 320,000.

(Production of Expandable Particles of Styrene-Modified Polyethylene-Based Resin and Evaluations of their Expandability and Moldability)

20 kg of the above-mentioned styrene-modified polyethylene-based resin particles and 400 g of toluene were introduced into a pressure-resistant twin-cylinder mixer which has an internal volume of 50 liter and can be hermetically sealed. After the mixer was hermetically sealed, it was rotated and 2800 g of butane (n-butane: i-butane=7:3, volume ratio, butane with the same volume ratio was used in the following Examples) was forced into the mixer. Then, the temperature was raised to 70° C. and maintained for 4 hours to impregnate butane into the particles. The mixer was then cooled and expandable particles of a styrene-modified polyethylene-based resin were taken out.

The expandable resin particles taken out from the mixer were immediately pre-expanded by steam to have a bulk density of 33 kg/m$^3$. About 24 hours later, the pre-expanded resin particles were filled into a mold and heated by steam to allow them to fuse together while being pre-expanded, so that an expanded molded article having a density of 33 kg/m$^3$ are obtained. The expanded molded article thus obtained had excellent strength, showing a compressive strength of 40 N/cm$^2$ and falling ball impact value as high as 85 cm. The dimensional change rate was 0.4%.

Example 2

The same polymerization procedure as in Example 1 was repeated except that the temperature for polymerization was 121° C., to obtain styrene-modified polyethylene-based resin particles, pre-expanded resin particles and an expanded molded article thereof.

The pre-expanded resin particles had a bulk density of 33 kg/m$^3$. The gel fraction measured was 26.5 wt %. The polystyrene content in the gel component was 31.9 wt %, and the powder content in the polymerized slurry was 0.8 wt %. The molecular weight of the polystyrene resin component was about 310,000.

The expanded molded article thus obtained had excellent strength, showing a density of 33 kg/m$^3$, compressive strength of 42 N/cm$^2$, and falling ball impact value as high as 95 cm. The dimensional change rate under heat was 0.3%.

Example 3

The same polymerization procedure as in Example 1 was repeated except that the temperature for polymerization was 122° C., to obtain styrene-modified polyethylene-based resin particles, pre-expanded resin particles and an expanded molded article thereof.

The gel fraction measured was 33.5 wt %. The polystyrene content in the gel component was 20.9 wt % and the powder content in the polymerized slurry was 0.7 wt %. The molecular weight of the polystyrene resin component was about 300,000.

The pre-expanded resin particles had a bulk density of 33 kg/m$^3$. The expanded molded article thus obtained had excellent strength, showing a density of 33 kg/m$^3$, compressive strength of 44 N/cm$^2$, and falling ball impact value as high as 95 cm. The dimensional change rate under heat was 0.2%.

Example 4

The same polymerization procedure as in Example 1 was repeated except that the temperature for polymerization was 123° C., to obtain styrene-modified polyethylene-based resin particles, pre-expanded resin particles and an expanded molded article thereof.

The gel fraction measured was 20.8 wt %. The polystyrene content in the gel component was 22.1 wt % and the powder content in the polymerized slurry was 0.6 wt %. The molecular weight of the polystyrene resin component was about 290,000.

The pre-expanded resin particles had a bulk density of 33 kg/m$^3$. The expanded molded article thus obtained had excellent strength, showing a density of 33 kg/m$^3$, compressive strength of 42 N/cm$^2$, and falling ball impact value as high as 90 cm. The dimensional change rate under heat was 0.3%.

Example 5

The same polymerization procedure as in Example 1 was repeated except that the temperature for polymerization was 125° C., to obtain styrene-modified polyethylene-based resin particles, pre-expanded resin particles and an expanded molded article thereof.

The gel fraction measured was 5.8 wt %. The polystyrene content in the gel component was 34.5 wt % and the powder content in the polymerized slurry was 0.5 wt %. The molecular weight of the polystyrene resin component was about 280,000.

The pre-expanded resin particles had a bulk density of 33 kg/m$^3$. The expanded molded article thus obtained had excellent strength, showing a density of 33 kg/m$^3$, compressive strength of 40 N/cm$^2$, and falling ball impact value as high as 85 cm. The dimensional change rate under heat was 0.4%.

Example 6

40 kg of pure water, 200 g of magnesium pyrophosphate as a dispersant, and 20 g of sodium dodecylbenzenesulfonate were introduced in an autoclave having an internal volume of 100 liter to prepare an aqueous medium. 4.4 kg of the polyethylene-based resin particles obtained in Example 1 was suspended in the medium and stirred at 150 rpm.

Into the autoclave, a mixed solution containing 13.2 kg of a styrene monomer (300 parts by weight relative to 100 parts by weight of polyethylene) and 39.6 g of TBPOEHC (0.3 parts by weight relative to 100 parts by weight of the styrene monomer) was added and allowed to stand at 60° C. for 60 minutes to impregnate the styrene monomer into the polyethylene-based resin.

Then, the temperature was raised to 122° C. and polymerization was carried out for 3 hours. After the conversion ratio of polymerization of the styrene monomer reached to 85%, a mixed solution containing 22.4 kg of a styrene monomer (500 parts by weight relative to 100 parts by weight of polyethylene) and 67.2 g of TBPB (0.3 parts by weight relative to 100 parts by weight of the styrene monomer) was added at 122° C. over a period of 5 hours to perform polymerization while impregnating the styrene monomer into the inside of polyethylene. Then, by raising to 140° C. and maintained for 2 hours, the remaining monomer was forcibly polymerized to reduce its amount, and then the autoclave was cooled to take out styrene-modified polyethylene-based resin particles.

The gel fraction measured was 38.5 wt %. The polystyrene content in the gel component was 21.3 wt % and the powder content in the polymerized slurry was 0.8 wt %. The molecular weight of the polystyrene resin component was about 300,000.

The same procedure as in Example 1 was repeated except that the obtained resin particles were used, so that a pre-expanded resin particles having a bulk density of 33 kg/m$^3$ and an expanded molded article having a density of 33 kg/m$^3$ were obtained. The expanded molded article thus obtained had excellent strength, showing a compressive strength of 48 N/cm$^2$ and falling ball impact value as high as 85 cm. The dimensional change rate under heat was 0.2%.

Example 7

40 kg of pure water, 200 g of magnesium pyrophosphate as a dispersant, and 20 g of sodium dodecylbenzenesulfonate were introduced in an autoclave having an internal volume of 100 liter to prepare an aqueous medium. 8.0 kg of the polyethylene-based resin particles obtained in Example 1 was suspended in the medium and stirred at 150 rpm.

Into the autoclave, a mixed solution containing 8.0 kg of a styrene monomer (100 parts by weight relative to 100 parts by weight of polyethylene) and 24.0 g of TBPB (0.3 parts by weight relative to 100 parts by weight of the styrene monomer) was added and allowed to stand at 60° C. for 60 minutes to impregnate the styrene monomer into the polyethylene-based resin particles. Then, the temperature was raised to 119° C. and polymerization was carried out for 3 hours. After the conversion ratio of polymerization of the styrene monomer reached to 85%, a mixed solution containing 24.0 kg of a styrene monomer (300 parts by weight relative to 100 parts by weight of polyethylene), and 27.0 g of TBPB (0.3 parts by weight relative to 100 parts by weight of the styrene monomer) was added at 121° C. over a period of 4 hours to perform polymerization while impregnating styrene into the inside of polyethylene. Then, by raising to 140° C. and maintained for 2 hours, the remaining monomer was forcibly polymerized to reduce its amount, and then the autoclave was cooled to obtain styrene-modified polyethylene-based resin particles. Pre-expanded resin particles and an expanded molded article were subsequently obtained in the same manner as in Example 1.

The gel fraction in the resin particles thus obtained was 7.2 wt %. The polystyrene content in the gel component was 25.0 wt % and the powder content in the polymerized slurry was 0.5 wt %. The molecular weight of the polystyrene resin component was about 300,000.

The pre-expanded resin particles had a bulk density of 33 kg/m$^3$. The expanded molded article thus obtained had excellent strength, showing a density of 33 kg/m$^3$, compressive strength of 43 N/cm$^2$, and falling ball impact value as high as 85 cm. The dimensional change rate under heat was 0.4%.

Example 8

The same polymerization procedure as in Example 7 was repeated except that the temperature for the first polymerization was 126° C. and that DCP was used as the polymerization initiator for the first polymerization, to obtain styrene-modified polyethylene-based resin particles, pre-expanded resin particles and an expanded molded article thereof.

The gel fraction in the resin particles thus obtained was 3.5 wt %. The polystyrene content in the gel component was 22.8 wt % and the powder content in the polymerized slurry was 0.5 wt %. The molecular weight of the polystyrene resin component was about 300,000.

The pre-expanded resin particles had a bulk density of 33 kg/m$^3$. The expanded molded article thus obtained had excellent strength, showing a density of 33 kg/m$^3$, compressive strength of 42 N/cm$^2$, and falling ball impact value as high as 85 cm. The dimensional change rate under heat was 0.4%.

Example 9

The same polymerization procedure as in Example 7 was repeated except that the temperatures for the first and second polymerization were 123° C. and 112° C., respectively, and that t-butylperoxy-3,5,5-trimethylhexanoate (TBPOTMH) was used as the polymerization initiator for the second polymerization, to obtain styrene-modified polyethylene-based resin particles, pre-expanded resin particles and an expanded molded article thereof.

The gel fraction in the resin particles thus obtained was 3.2 wt %. The polystyrene content in the gel component was 24.4 wt % and the powder content in the polymerized slurry was 0.5 wt %. The molecular weight of the polystyrene resin component was about 340,000.

The pre-expanded resin particles had a bulk density of 33 kg/m$^3$. The expanded molded article thus obtained had excellent strength, showing a density of 33 kg/m$^3$, compressive strength of 43 N/cm$^2$, and falling ball impact value as high as 85 cm. The dimensional change rate under heat was 0.3%.

Example 10

The same polymerization procedure as in Example 7 was repeated except that the temperatures for the first and second polymerization were 123° C. and 130° C., respectively, and that DCP was used as the polymerization initiator for the first polymerization, to obtain styrene-modified polyethylene-based resin particles, pre-expanded resin particles and an expanded molded article thereof.

The gel fraction in the resin particles thus obtained was 3.8 wt %. The polystyrene content in the gel component was 24.2 wt % and the powder content in the polymerized slurry was 0.6 wt %. The molecular weight of the polystyrene resin component was about 240,000.

The pre-expanded resin particles had a bulk density of 33 kg/m$^3$. The expanded molded article thus obtained had excellent strength, showing a density of 33 kg/m$^3$, compressive strength of 43 N/cm$^2$, and falling ball impact value as high as 85 cm. The dimensional change rate under heat was 0.4%.

Example 11

40 kg of pure water, 200 g of magnesium pyrophosphate as a dispersant, and 20 g of sodium dodecylbenzenesulfonate were introduced in an autoclave having an internal volume of 100 liter to prepare an aqueous medium. 8.0 kg of the polyethylene-based resin particles obtained in Example 1 was suspended in the medium and stirred at 150 rpm.

Into the autoclave, a mixed solution containing 8.0 kg of a styrene monomer (100 parts by weight relative to 100 parts by weight of polyethylene) and 48.0 g of TBPB (0.6 parts by weight relative to 100 parts by weight of the styrene monomer) was added and allowed to stand at 60° C. for 60 minutes to impregnate the styrene monomer into the polyethylene-based resin particles. Then, the temperature was raised to 120° C. and polymerization was carried out for 3 hours.

After the conversion ratio of polymerization of the styrene monomer reached to 90%, a mixed solution containing 24.0 kg of a styrene monomer (300 parts by weight relative to 100 parts by weight of polyethylene) and 144.0 g of TBPB (0.6 parts by weight relative to 100 parts by weight of the styrene monomer) was added at 120° C. over a period of 4 hours to perform polymerization while impregnating styrene into the inside of polyethylene. Then, by raising to 140° C. and maintained for 2 hours, the remaining monomer was forcibly polymerized to reduce its amount, and then the autoclave was cooled to obtain styrene-modified polyethylene-based resin particles. Pre-expanded resin particles and an expanded molded article were subsequently obtained in the same manner as in Example 1.

The gel fraction in the resin particles thus obtained was 19.6 wt %. The polystyrene content in the gel component was 25.0 wt % and the powder content in the polymerized slurry was 0.7 wt %. The molecular weight of the polystyrene resin component was about 260,000.

The pre-expanded resin particles had a bulk density of 33 kg/m$^3$. The expanded molded article thus obtained had excellent strength, showing a density of 33 kg/m$^3$, compressive strength of 40 N/cm$^2$, and falling ball impact value as high as 90 cm. The dimensional change rate under heat was 0.3%.

Example 12

The same polymerization procedure as in Example 11 was repeated except that the respective amount of the polymerization initiators for the first and second polymerization was 0.3 parts by weight and that the mixed solution for the second polymerization was added after the conversion ratio of polymerization reached to 95%, to obtain styrene-modified polyethylene-based resin particles, pre-expanded resin particles and an expanded molded article thereof.

The gel fraction measured was 18 wt %. The polystyrene content in the gel component was 23.3 wt % and the powder content in the polymerized slurry was 0.3 wt %. The molecular weight of the polystyrene resin component was about 320,000.

The pre-expanded resin particles had a bulk density of 33 kg/m$^3$. The expanded molded article thus obtained had excellent strength, showing a density of 33 kg/m$^3$, compressive strength of 46 N/cm$^2$, and falling ball impact value as high as 95 cm. The dimensional change rate under heat was 0.2%.

Example 13

40 kg of pure water, 200 g of magnesium pyrophosphate as a dispersant, and 20 g of sodium dodecylbenzenesulfonate were introduced in an autoclave having an internal volume of 100 liter to prepare an aqueous medium. 8.0 kg of the polyethylene-based resin particles obtained in Example 1 was suspended in the medium and stirred at 150 rpm.

Into the autoclave, a mixed solution containing 8.0 kg of a styrene monomer (100 parts by weight relative to 100 parts by weight of polyethylene) and 19.20 g of TBPB (0.24 parts by weight relative to 100 parts by weight of the styrene monomer) was added and allowed to stand at 60° C. for 60 minutes to impregnate the styrene monomer into the polyethylene-based resin particles. Then, the temperature was raised to 120° C. and polymerization was carried out for 3 hours. After the conversion ratio of polymerization of the styrene monomer reached to 90%, a mixed solution containing 24.0 kg of a styrene monomer (300 parts by weight relative to 100 parts by weight of polyethylene) and 57.6 g of TBPB (0.24 parts by weight relative to 100 parts by weight of the styrene monomer) was added at 120° C. over a period of 4 hours to perform polymerization while impregnating styrene into the inside of polyethylene. Then, by raising to 140° C. and maintained for 2 hours, the remaining monomer was forcibly polymerized to reduce its amount, and then the autoclave was cooled to obtain styrene-modified polyethylene-based resin particles. Pre-expanded resin particles and an expanded molded article were subsequently obtained in the same manner as in Example 1.

The gel fraction in the resin particles thus obtained was 17.5 wt %. The polystyrene content in the gel component was 24.6 wt % and the powder content in the polymerized slurry was 0.5 wt %. The molecular weight of the polystyrene resin component was about 320,000.

The pre-expanded resin particles had a bulk density of 33 kg/m$^3$. The expanded molded article thus obtained had a density of 33 kg/m$^3$, a compressive strength of 46 N/cm$^2$, and falling ball impact value of 95 cm. The dimensional change rate under heat was 0.2%.

Comparative Example 1

The same polymerization procedure as in Example 1 was repeated except that the temperature for polymerization was 117° C., and the styrene-modified polyethylene-based resin particles, pre-expanded resin particles and an expanded molded article thereof were obtained.

The gel fraction measured was 0.3 wt %. The polystyrene content in the gel component was 26.6 wt % and the powder content in the polymerized slurry was 0.5 wt %. The molecular weight of the polystyrene resin component was about 330,000.

The pre-expanded resin particles had a bulk density of 33 kg/m$^3$. The expanded molded article thus obtained had a density of 33 kg/m$^3$, a compressive strength of 36 N/cm$^2$, and falling ball impact value of 80 cm. The dimensional change rate under heat was 0.8%.

Comparative Example 2

The same polymerization procedure as in Example 1 was repeated except that the temperature for polymerization was 130° C. and dicumyl peroxide (DCP) was adopted as the polymerization initiators, to obtain styrene-modified polyethylene-based resin particles, pre-expanded resin particles and an expanded molded article thereof.

The gel fraction measured was 0.8 wt %. The polystyrene content in the gel component was 25.0 wt % and the powder content in the polymerized slurry was 0.8 wt %. The molecular weight of the polystyrene resin component was about 240,000.

The pre-expanded resin particles had a bulk density of 33 kg/m$^3$. The expanded molded article thus obtained had excellent strength, showing a density of 33 kg/m$^3$, compressive strength of 38 N/cm², and falling ball impact value as high as 80 cm. However, the dimensional change rate under heat was 0.7%.

Comparative Example 3

The same polymerization procedure as in Example 1 was repeated except that an additional styrene monomer was added when the conversion ratio of polymerization reached to 60%, to obtain styrene-modified polyethylene-based resin particles, pre-expanded resin particles and an expanded molded article thereof.

The gel fraction measured was 5.6 wt %. The polystyrene content in the gel component was 21.4 wt % and the powder content in the polymerized slurry was 1.6 wt %. The molecular weight of the polystyrene resin component was about 320,000.

The pre-expanded resin particles had a bulk density of 33 kg/m³. The expanded molded article thus obtained had a density of 33 kg/m³. Since the polymerization did not occur smoothly, a large amount of polymer powder of polystyrene was generated, whereby fusibility of expanded particles was decreased. Consequently, the compressive strength was 38 N/cm², and falling ball impact value was 60 cm. The dimensional change rate under heat was 0.8%.

Comparative Example 4

The same polymerization procedure as in Example 7 was repeated except that the temperatures for the first and second polymerization were 117° C. and 121° C., respectively, to obtain styrene-modified polyethylene-based resin particles, pre-expanded resin particles and an expanded molded article thereof.

The gel fraction in the resin particles thus obtained was 1.6 wt %. The polystyrene content in the gel component was 25.0 wt % and the powder content in the polymerized slurry was 0.5 wt %. The molecular weight of the polystyrene resin component was about 300,000.

The pre-expanded resin particles had a bulk density of 33 kg/m³. The expanded molded article thus obtained had a density of 33 kg/m³, a compressive strength of 38 N/cm², and falling ball impact value of 80 cm. The dimensional change rate under heat was 0.7%.

Comparative Example 5

The same polymerization procedure as in Example 7 was repeated except that the temperature for the first polymerization was 128° C. and that DCP was adopted as the polymerization initiator for the first polymerization, to obtain styrene-modified polyethylene-based resin particles, pre-expanded resin particles and an expanded molded article thereof.

The gel fraction in the resin particles thus obtained was 1.8 wt %. The polystyrene content in the gel component was 25.0 wt % and the powder content in the polymerized slurry was 0.6 wt %. The molecular weight of the polystyrene resin component was about 300,000.

The pre-expanded resin particles had a bulk density of 33 kg/m³. The expanded molded article thus obtained had a density of 33 kg/m³, a compressive strength of 40 N/cm², and falling ball impact value of 80 cm. The dimensional change rate under heat was 0.7%.

Comparative Example 6

The same polymerization procedure as in Example 7 was repeated except that the temperatures for the first and second polymerization were 123° C. and 110° C., respectively, and that TBPOTMH was adopted as the polymerization initiator for the second polymerization, to obtain styrene-modified polyethylene-based resin particles, pre-expanded resin particles and an expanded molded article thereof.

The gel fraction in the resin particles thus obtained was 2.6 wt %. The polystyrene content in the gel component was 25.0 wt % and the powder content in the polymerized slurry was 0.5 wt %. The molecular weight of the polystyrene resin component was about 360,000.

The pre-expanded resin particles had a bulk density of 33 kg/m³. The expanded molded article thus obtained had a density of 33 kg/m³, a compressive strength of 37 N/cm², and falling ball impact value of 50 cm. The dimensional change rate under heat was 0.4%.

Comparative Example 7

The same polymerization procedure as in Example 7 was repeated except that the temperatures for the first and second polymerization were 123° C. and 132° C., respectively, and that DCP was adopted as the polymerization initiator for the second polymerization, to obtain styrene-modified polyethylene-based resin particles, pre-expanded resin particles and an expanded molded article thereof.

The gel fraction in the resin particles thus obtained was 1.8 wt %. The polystyrene content in the gel component was 24.4 wt % and the powder content in the polymerized slurry was 0.6 wt %. The molecular weight of the polystyrene resin component was about 220,000.

The pre-expanded resin particles had a bulk density of 33 kg/m³. The expanded molded article thus obtained had a density of 33 kg/m³, a compressive strength of 40 N/cm², and falling ball impact value of 80 cm. The dimensional change rate under heat was 0.7%.

Comparative Example 8

40 kg of pure water, 200 g of magnesium pyrophosphate as a dispersant, and 20 g of sodium dodecylbenzenesulfonate were introduced in an autoclave having an internal volume of 100 liter to prepare an aqueous medium. 8.0 kg of the polyethylene-based resin particles obtained in Example 1 was suspended in the medium and stirred at 150 rpm.

Into the autoclave, a mixed solution containing 32.0 kg of a styrene monomer (400 parts by weight relative to 100 parts by weight of polyethylene) and 96 g of TBPB (0.3 parts by weight relative to 100 parts by weight of the styrene monomer) was added and allowed to stand at 60° C. for 60 minutes to impregnate the styrene monomer into the polyethylene-based resin particles. Then, the temperature was raised to 121° C. and polymerization was carried out for 5 hours. Subsequently, by raising to 140° C. and maintained for 2 hours, the remaining monomer was forcibly polymerized to reduce its amount, and then the autoclave was cooled to obtain styrene-modified polyethylene-based resin particles.

The gel fraction measured was 1.7 wt %. The polystyrene content in the gel component was 20.6 wt % and the powder content in the polymerized slurry was 1.8 wt %. The molecular weight of the polystyrene resin component was about 320,000.

Since the polymerized slurry contained a large amount of polymer powder and the powder impairs the fusibility of the expandable particles, fine pre-expanded resin particles and an expanded molded article could not be obtained.

Comparative Example 9

The same polymerization procedure as in Example 11 was repeated except that the respective amount of the polymerization initiator for the first and second polymerization was 0.3 parts by weight and that the mixed solution for the second polymerization was added after the conversion ratio of polymerization reached to 75%, to obtain styrene-modified polyethylene-based resin particles, pre-expanded resin particles and an expanded molded article thereof.

The gel fraction measured was 7.2 wt %. The polystyrene content in the gel component was 22.2 wt %. Since the excess styrene monomer was polymerized alone or on the surface of the polyethylene-based resin particles, the amount of the polymer powder generated was extremely large such that the powder content in the polymerized slurry was 1.9 wt %. The molecular weight of the polystyrene resin component was about 320,000.

The pre-expanded resin particles had a bulk density of 33 kg/m$^3$. The expanded molded article thus obtained had a density of 33 kg/m$^3$ and a compressive strength of 45 N/cm$^2$. Since a large amount of polymer powder of polystyrene was generated and thereby fusibility of the expanded particles decreased, the falling ball impact value was as low as 40 cm. The dimensional change rate under heat was 0.4%.

A ratio between materials and polymerization conditions of Examples 1 to 13 and Comparative examples 1 to 9 are shown in Table 1. The gel fraction, polystyrene content, powder content, molecular weight of the polystyrene resin component, compressive strength, falling ball impact value and dimensional change rate under heat are together shown in Table 2.

TABLE 1

| | | PE/PS ($1^{st}$ & $2^{nd}$) | Conversion Ratio of Polymerization (%) | Polymerization Temp. ($1^{st}/2^{nd}$) (° C.) | Polymerization Initiator ($1^{st}/2^{nd}$) | Amount of Initiator ($1^{st}/2^{nd}$) (wt %) |
|---|---|---|---|---|---|---|
| EXAMPLES | 1 | 100/400(200 + 200) | 85 | 119/119 | TPOEHC/TBPB | 0.3/0.3 |
| | 2 | 100/400(200 + 200) | 85 | 121/121 | TPOEHC/TBPB | 0.3/0.3 |
| | 3 | 100/400(200 + 200) | 85 | 122/122 | TPOEHC/TBPB | 0.3/0.3 |
| | 4 | 100/400(200 + 200) | 85 | 123/123 | TPOEHC/TBPB | 0.3/0.3 |
| | 5 | 100/400(200 + 200) | 85 | 125/125 | TPOEHC/TBPB | 0.3/0.3 |
| | 6 | 100/800(300 + 500) | 85 | 122/122 | TBPOEHC/TBPB | 0.3/0.3 |
| | 7 | 100/400(100 + 300) | 85 | 119/121 | TBPB/TBPB | 0.3/0.3 |
| | 8 | 100/400(100 + 300) | 85 | 126/121 | DCP/TBPB | 0.3/0.3 |
| | 9 | 100/400(100 + 300) | 85 | 123/112 | TBPB/TBPOTMH | 0.3/0.3 |
| | 10 | 100/400(100 + 300) | 85 | 123/130 | TBPB/DCP | 0.3/0.3 |
| | 11 | 100/400(100 + 300) | 90 | 120/120 | TBPB/TBPB | 0.6/0.6 |
| | 12 | 100/400(100 + 300) | 95 | 120/120 | TBPB/TBPB | 0.3/0.3 |
| | 13 | 100/400(100 + 300) | 85 | 120/120 | TBPB/TBPB | 0.24/0.24 |
| COMP. EXAMPLES | 1 | 100/400(200 + 200) | 85 | 117/117 | TPOEHC/TBPB | 0.3/0.3 |
| | 2 | 100/400(200 + 200) | 85 | 130/130 | DCP/DCP | 0.3/0.3 |
| | 3 | 100/400(200 + 200) | 60 | 119/119 | TPOEHC/TBPB | 0.3/0.3 |
| | 4 | 100/400(100 + 300) | 85 | 117/121 | TBPB/TBPB | 0.3/0.3 |
| | 5 | 100/400(100 + 300) | 85 | 128/121 | DCP/TBPB | 0.3/0.3 |
| | 6 | 100/400(100 + 300) | 85 | 123/110 | TBPB/TBPOTMH | 0.3/0.3 |
| | 7 | 100/400(100 + 300) | 85 | 123/132 | TBPB/DCP | 0.3/0.3 |
| | 8 | 100/400 | — | 121 | TBPB | 0.3 |
| | 9 | 100/400(200 + 200) | 75 | 120/120 | TBPB/TBPB | 0.3/0.3 |

TABLE 2

| | | Gel Fraction (wt %) | PS Content (wt %) | Powder Content (wt %) | M.W. Ca. (×10$^4$) | Compressive Strength (N/cm$^2$) | Falling Ball Impact Value (cm) | Dimensional Change Rate under Heat (%) |
|---|---|---|---|---|---|---|---|---|
| EXAMPLES | 1 | 7.2 | 22.2 | 0.7 | 32 | 40 | 85 | 0.4 |
| | 2 | 26.5 | 21.9 | 0.8 | 31 | 42 | 95 | 0.3 |
| | 3 | 33.5 | 20.9 | 0.7 | 30 | 44 | 95 | 0.2 |
| | 4 | 20.8 | 22.1 | 0.6 | 29 | 42 | 90 | 0.3 |
| | 5 | 5.8 | 34.5 | 0.5 | 28 | 40 | 85 | 0.4 |
| | 6 | 38.5 | 21.3 | 0.8 | 30 | 48 | 85 | 0.2 |
| | 7 | 7.2 | 25.0 | 0.5 | 30 | 43 | 85 | 0.4 |
| | 8 | 3.5 | 22.8 | 0.5 | 30 | 42 | 85 | 0.4 |
| | 9 | 3.2 | 24.4 | 0.5 | 34 | 43 | 85 | 0.3 |
| | 10 | 3.8 | 24.2 | 0.6 | 24 | 43 | 85 | 0.4 |
| | 11 | 19.6 | 25.0 | 0.7 | 26 | 40 | 90 | 0.4 |
| | 12 | 18 | 23.3 | 0.3 | 32 | 46 | 95 | 0.3 |
| | 13 | 17.5 | 24.6 | 0.5 | 32 | 46 | 95 | 0.2 |
| COMP. EXAMPLES | 1 | 0.3 | 26.6 | 0.5 | 33 | 36 | 80 | 0.8 |
| | 2 | 0.8 | 25.0 | 0.8 | 24 | 38 | 80 | 0.7 |
| | 3 | 5.6 | 21.4 | 1.6 | 32 | 38 | 60 | 0.8 |

TABLE 2-continued

|   | Gel Fraction (wt %) | PS Content (wt %) | Powder Content (wt %) | M.W. Ca. (×10⁴) | Compressive Strength (N/cm²) | Falling Ball Impact Value (cm) | Dimensional Change Rate under Heat (%) |
|---|---|---|---|---|---|---|---|
| 4 | 1.6 | 25.0 | 0.5 | 30 | 38 | 80 | 0.7 |
| 5 | 1.8 | 25.0 | 0.6 | 30 | 40 | 80 | 0.7 |
| 6 | 2.6 | 25.0 | 0.5 | 36 | 37 | 50 | 0.4 |
| 7 | 1.8 | 24.4 | 0.6 | 22 | 40 | 80 | 0.7 |
| 8 | 1.7 | 20.6 | 1.8 | 32 | — | — | — |
| 9 | 7.2 | 22.2 | 1.9 | 32 | 45 | 40 | 0.4 |

Example 14

Polyethylene-based resin particles were obtained in the same manner as in Example 1 except that linear low-density polyethylene having a different melting point from that used in Example 1 (ethylene-butene copolymer: melt index of 0.7 g/10 min, density of 0.922 g/ml, melting point of 121° C.) was used.

40 kg of pure water, 200 g of magnesium pyrophosphate as a dispersant, and 20 g of sodium dodecylbenzenesulfonate were introduced in an autoclave having an internal volume of 100 liter to prepare an aqueous medium. 8.0 kg of the polyethylene-based resin particles was suspended in the medium and stirred at 150 rpm.

Into the autoclave, a mixed solution containing 8.0 kg of a styrene monomer (100 parts by weight relative to 100 parts by weight of polyethylene) and 24.0 g of TBPB (0.3 parts by weight relative to 100 parts by weight of the styrene monomer) was added and allowed to stand at 60° C. for 60 minutes to impregnate the styrene monomer into the polyethylene-based resin particles. Then, the temperature was raised to 118° C. and polymerization was carried out for 3 hours.

After the conversion ratio of polymerization of the styrene monomer reached to 90%, a mixed solution containing 24.0 kg of a styrene monomer (300 parts by weight relative to 100 parts by weight of polyethylene) and 72.0 g of TBPB (0.3 parts by weight relative to 100 parts by weight of the styrene monomer) was added at 118° C. over a period of 4 hours to perform polymerization while impregnating the styrene monomer into the inside of polyethylene. Then, by raising to 140° C. and maintained for 2 hours, the remaining monomer was forcibly polymerized to reduce its amount, and then the autoclave was cooled to obtain styrene-modified polyethylene-based resin particles. A pre-expanded resin particles and expanded molded article were subsequently obtained in the same manner as in Example 1.

The gel fraction in the resin particles thus obtained was 29.8 wt %. The polystyrene content in the gel component was 24.2 wt % and the powder content in the polymerized slurry was 0.5 wt %. The molecular weight of the polystyrene resin component was about 320,000.

The pre-expanded resin particles had a bulk density of 33 kg/m³. The expanded molded article thus obtained had excellent strength, showing a density of 33 kg/m³, compressive strength of 43 N/cm², and falling ball impact value as high as 90 cm. The dimensional change rate under heat was 0.2%.

The ratio between materials, polymerization conditions, powder content, gel fraction, polystyrene content, molecular weight of the polystyrene resin component, falling ball impact value, compressive strength and dimensional change rate under heat of Example 14 are together shown in Table 3.

TABLE 3

| | |
|---|---|
| PE/PS (1$^{st}$ and 2$^{nd}$) | 100/400 (100/300) |
| Polymerization Temperature (1$^{st}$/2$^{nd}$) (° C.) | 118/118 |
| Conversion ratio of polymerization (%) | 90 |
| Polymerization Initiator (1$^{st}$/2$^{nd}$) | TBPB/TBPB |
| Amount of Initiator (1$^{st}$/2$^{nd}$) (wt %) | 0.3/0.3 |
| Gel Fraction (%) | 29.8 |
| PS Content (wt %) | 24.2 |
| Powder Content (wt %) | 0.5 |
| M.W. (×10⁴) | About 32 |
| Falling Ball Impact Value (cm) | 90 |
| Compressive Strength (N/cm²) | 43 |
| Dimensional Change Rate under Heat (%) | 0.2 |

As seen in Table 3, it is understood that an expanded molded article having excellent impact resistance, stiffness, and heat resistance can be provided even with the polyethylene-based resin having the different melting point.

Example 15

40 kg of pure water, 200 g of magnesium pyrophosphate as a dispersant, and 20 g of sodium dodecylbenzenesulfonate were introduced in an autoclave having an internal volume of 100 liter to prepare an aqueous medium. 8.0 kg of the polyethylene-based resin particles obtained in Example 1 was suspended in the medium and stirred at 150 rpm.

Into the autoclave, a mixed solution containing 3.2 kg of a styrene monomer (400 parts by weight relative to 100 parts by weight of polyethylene) and 9.6 g of DCP (0.3 parts by weight relative to 100 parts by weight of the styrene monomer) was added and allowed to stand at 60° C. for 60 minutes to impregnate the styrene monomer into the polyethylene-based resin particles. Then, the temperature was raised to 126° C. and polymerization was carried out for 3 hours.

After the conversion ratio of polymerization of the styrene monomer reached to 90%, a mixed solution containing 28.6 kg of a styrene monomer (358 parts by weight relative to 100 parts by weight of polyethylene), 0.2 kg of α-methyl styrene (2 parts by weight relative to 100 parts by weight of polyethylene) and 86.4 g of TBPB (0.3 parts by weight relative to 100 parts by weight of the styrene monomer) was added at 122° C. over a period of 5 hours to perform polymerization while impregnating styrene into the inside of polyethylene. Then, by raising to 140° C. and maintained for 2 hours, the remaining monomer was forcibly polymerized to reduce its amount, and then the autoclave was cooled to obtain styrene-modified polyethylene-based resin particles. Pre-expanded resin particles and an expanded molded article were subsequently obtained in the same manner as in Example 1.

The gel fraction in the resin particles thus obtained was 30.6 wt %. The polystyrene content in the gel component was 25.0 wt % and the powder content in the polymerized slurry was 0.8 wt %. The molecular weight of the polystyrene resin component was about 300,000.

The pre-expanded resin particles had a bulk density of 33 kg/m$^3$. The expanded molded article thus obtained had excellent strength, showing a density of 33 kg/m$^3$, compressive strength of 42 N/cm$^2$, and falling ball impact value as high as 90 cm. The dimensional change rate under heat was 0.2%.

The ratio between materials, polymerization conditions, powder content, gel fraction, polystyrene content, molecular weight of the polystyrene resin component, falling ball impact value, compressive strength and dimensional change rate under heat of Example 15 are together shown in Table 4.

TABLE 4

| | |
|---|---|
| PE/PS (1$^{st}$ and 2$^{nd}$) | 100/400 (40/360) |
| Polymerization Temperature (1$^{st}$/2$^{nd}$) (° C.) | 126/122 |
| Conversion ratio of polymerization (%) | 90 |
| Polymerization Initiator (1$^{st}$/2$^{nd}$) | DCP/TBPB |
| Amount of Initiator (1$^{st}$/2$^{nd}$) (wt %) | 0.3/0.3 |
| Gel Fraction (%) | 30.6 |
| PS Content (wt %) | 25.0 |
| Powder Content (wt %) | 0.8 |
| M.W. (×10$^4$) | 約30 |
| Falling Ball Impact Value (cm) | 90 |
| Compressive Strength (N/cm$^2$) | 42 |
| Dimensional Change Rate under Heat (%) | 0.2 |

As seen in Table 4, it is understood that an expanded molded article having excellent impact resistance, stiffness, and heat resistance can be provided even with a mixture of two different styrene monomers.

As described hereinbefore, by controlling selection of the polymerization initiator and the polymerization temperature at impregnation and polymerization of the styrene monomer into the polyethylene-based resin particles for polymerization, the expandable particles of the styrene-modified linear low-density polyethylene-based resin which control the gel fraction and which satisfy physical properties such as impact resistance, stiffness, and heat resistance can be provided.

The invention claimed is:

1. A method for producing expandable particles of a styrene-modified linear low-density polyethylene-based resin comprising, in the order recited:
   dispersing 100 parts by weight of non-crosslinked linear low-density polyethylene-based resin particles, 30 to 300 parts by weight of a styrene-based monomer, and 0.1 to 0.9 parts by weight of a polymerization initiator relative to 100 parts by weight of the styrene-based monomer into a suspension containing a dispersant;
   impregnating the styrene-based monomer into the low-density polyethylene-based resin particles by heating a resultant dispersion at such a temperature that polymerization of the styrene-based monomer does not substantially take place;
   performing a first polymerization of the styrene-based monomer at a temperature of higher than (T−8) ° C. and lower than (T+1) ° C., T ° C. being a melting point of the low-density polyethylene-based resin particles;
   adding a styrene-based monomer and 0.1 to 0.9 parts by weight of a polymerization initiator relative to 100 parts by weight of the styrene-based monomer after the first polymerization has reached a conversion ratio of from 80% to 99.9%, and performing an impregnation of the styrene-based monomer into the low-density polyethylene-based resin particles and a second polymerization of the styrene-based monomer at a temperature of higher than (T−15) ° C. and lower than (T+5) ° C., T ° C. being a melting point of the polyethylene-based resin particles; and
   impregnating a volatile blowing agent during or after the polymerization; a total amount of the styrene monomers used in the first and second polymerizations being more than 300 parts by weight and not more than 1000 parts by weight relative to 100 parts by weight of the low-density polyethylene-based resin particles;
   whereby resin components of the expandable particles contain a gel component comprising from 2 to 40 wt% of a graft polymer.

2. The method of claim 1, wherein the second polymerization is performed at a temperature in a range of from higher than (T−8) ° C. to lower than (T+1) ° C.

3. The method of claim 1, wherein the linear low-density polyethylene-based resin particles each have a substantially spherical shape or a cylindrical shape having an L/D of from 0.6 to 1.6, L being a length of each particle and D being a diameter of each particle, and an average particle size of from 0.2 to 1.5 mm.

4. The method of claim 1, wherein the styrene-based monomer comprises at least one of styrene, a-methylstyrene, vinyltoluene, and chlorostyrene.

5. The method of claim 1, wherein a molecular weight of a polystyrene-based resin component is from about 200,000 to 400,000.

6. The method of claim 1, wherein the non-crosslinked linear low-density polyethylene-based resin comprises a copolymer of ethylene and an α-olefin.

7. The method of claim 6, wherein the α-olefin comprises at least one of 1-butene, 1-pentene, 1-hexene, 3,3-dimethyl-1-butene, 4-methyl-1-pentene, 4,4-dimethyl-1-pentene, and 1-octene.

8. The method of claim 1, wherein 0.2 to 0.5 parts by weight of a polymerization initiator relative to 100 parts by weight of the styrene-based monomer are used.

9. The method of claim 1, wherein the total amount of the styrene monomers used in the first and second polymerizations is not more than 900 parts by weight relative to 100 parts by weight of the low-density polyethylene-based resin particles.

10. The method of claim 1, wherein the gel component comprises from 5 to 35 wt % of a graft polymer.

11. The method of claim 4, wherein the second polymerization is performed at a temperature in a range of from higher than (T−8) ° C. to lower than (T+1) ° C.; from 0.2 to 0.5 parts by weight of a polymerization initiator relative to 100 parts by weight of the styrene-based monomer are used; the non-crosslinked linear low-density polyethylene-based resin comprises a copolymer of ethylene and at least one of 1-butene and 1-hexene; the total amount of the styrene monomers used in the first and second polymerizations is not more than 900 parts by weight relative to 100 parts by weight of the low-density polyethylene-based resin particles; and the gel component comprises from 5 to 35 wt % of a graft polymer.

12. Expandable particles of a styrene-modified linear low-density polyethylene-based resin, wherein the particles comprise a volatile blowing agent and a base resin, the base resin comprising more than 300 parts by weight and less than 1000 parts by weight of a polystyrene-based resin component relative to 100 parts by weight of a non-crosslinked linear low-density polyethylene-based resin component, the base resin comprising from 2 to 40 wt % of a gel component comprising a graft copolymer of the polystyrene-based resin component and the low-density polyethylene-based resin component.

13. The expandable particles of claim 12, wherein the base resin comprises not more than 900 parts by weight of a polystyrene-based resin component relative to 100 parts by weight of a non-crosslinked linear low-density polyethylene-based resin component.

14. The expandable particles of claim 13, wherein the base resin comprises from 5 to 35 wt % of a gel component comprising a graft copolymer of the polystyrene-based resin component and the low-density polyethylene-based resin component.

15. The expandable particles of claim 13, wherein a molecular weight of the polystyrene-based resin component is from about 200,000 to 400,000.

16. Expandable particles of a styrene-modified linear low-density polyethylene-based resin, wherein the particles are obtained by the method of claim 1.

17. Pre-expanded particles having a bulk density of from 20 to 200 $kg/m^3$, obtained by pre-expanding the expandable particles of the styrene-modified linear low-density polyethylene-based resin of claim 12.

18. An expanded molded article having a density of from 20 to 200 $kg/m^3$, obtained by expansion molding of the pre-expanded particles of claim 17.

19. Pre-expanded particles having a bulk density of from 20 to 200 $kg/m^3$, obtained by pre-expanding the expandable particles of the styrene-modified linear low-density polyethylene-based resin of claim 16.

20. An expanded molded article having a density of 20 to 200 $kg/m^3$, obtained by expansion molding of the pre-expanded particles of claim 19.

* * * * *

UNITED STATES PATENT AND TRADEMARK OFFICE
CERTIFICATE OF CORRECTION

PATENT NO. : 7,767,724 B2
APPLICATION NO. : 10/541391
DATED : August 3, 2010
INVENTOR(S) : Hideyasu Matsumura et al.

It is certified that error appears in the above-identified patent and that said Letters Patent is hereby corrected as shown below:

On the Title Page Item (54), and Col. 1, lines 1-5 Title, "EXPANDABLE RESIN BEADS OF STYRENE-MODIFIED STRAIGHT-CHAIN AND LOW-DENSITY POLYETHYLENE, PROCESS FOR PRODUCTION THEREOF, PRE-EXPAND BEADS, AND FOAMS" should read --EXPANDABLE PARTICLES OF STYRENE-MODIFIED LINEAR LOW-DENSITY POLYETHYLENE-BASED RESIN, PRODUCTION METHOD THEREFOR, PRE-EXPANDED PARTICLES, AND EXPANDED MOLDED ARTICLE--.

On the Title Page at Item (57), ABSTRACT, line 2, "beads" should read --particles--.

Signed and Sealed this

Ninth Day of November, 2010

David J. Kappos
*Director of the United States Patent and Trademark Office*